Nov. 18, 1958
J. P. FLOCK
2,860,716
DETACHABLE MOTOR AND HANDLE UNIT
Filed Jan. 17, 1955
2 Sheets-Sheet 1
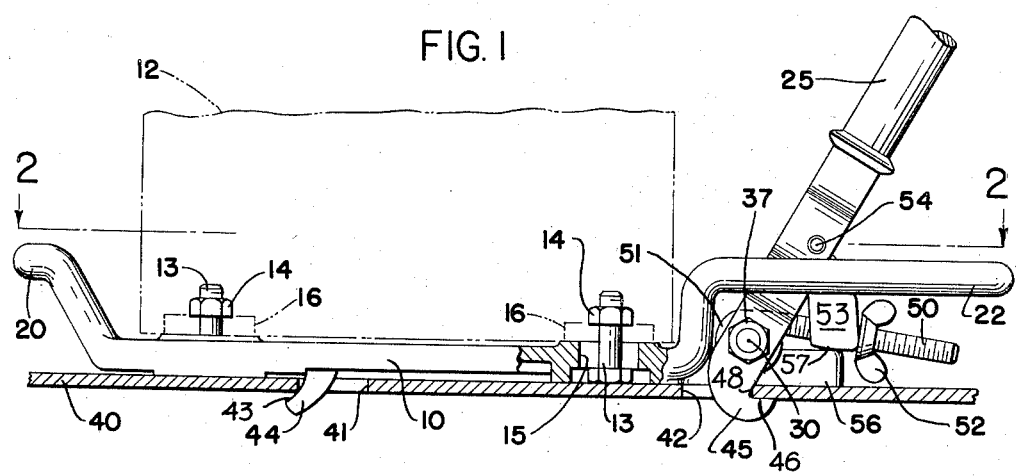
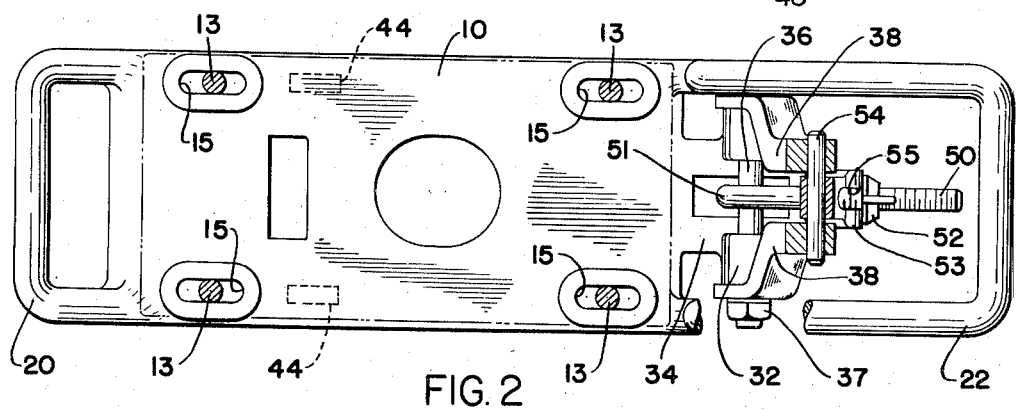
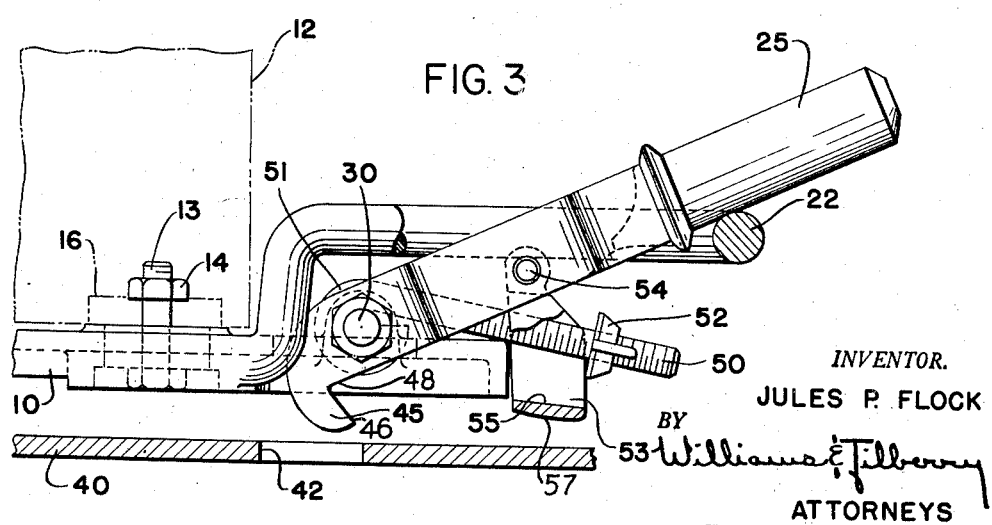
INVENTOR.
JULES P. FLOCK
BY Williams & Tilberry
ATTORNEYS

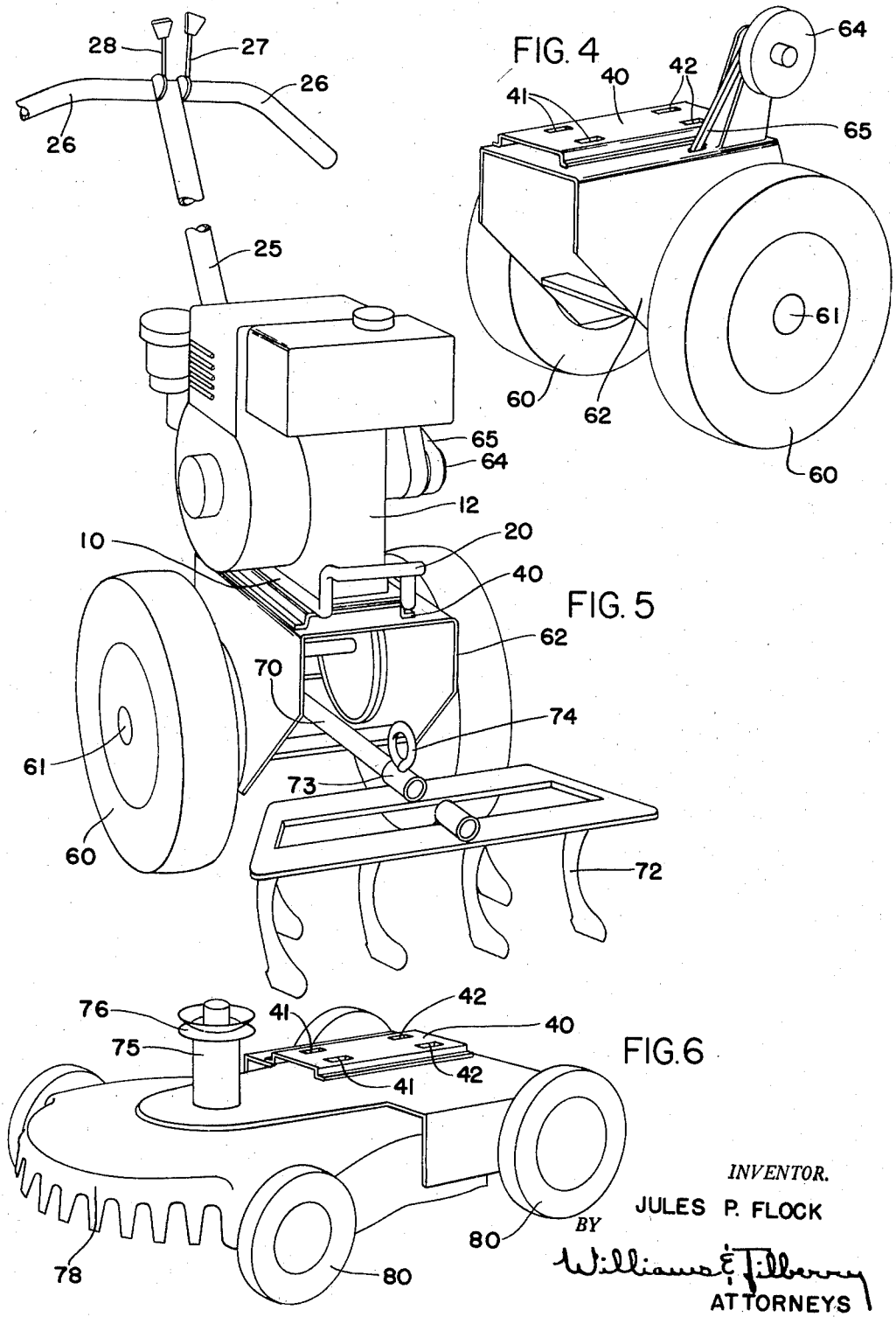

United States Patent Office 2,860,716
Patented Nov. 18, 1958

2,860,716

DETACHABLE MOTOR AND HANDLE UNIT

Jules P. Flock, Mantua, Ohio

Application January 17, 1955, Serial No. 482,118

5 Claims. (Cl. 180—19)

This invention relates to small garden tractor equipment and more particularly to that type of equipment in which a power driven unit is guided manually by an operator who walks behind.

Equipment of this type is available in a variety of ground working units, such as lawn mowers, cultivators, plows, snow shovels and the like. One problem having to do with marketing such equipment arises from the cost involved if an individual power unit is provided for each of the various types of ground working units used. It would be desirable to provide a single motor and be able to transfer it from one unit to another with a minimum of effort, so that duplication of cost of the driving mechanism would be avoided. Heretofore, garden equipment of this type has been constructed in which a single basic unit embodies a wheel tractor element having a substantial frame to support the wheels and a motor permanently secured to the frame with a control handle for use of the operator. To this basic unit there then would be attached, as circumstances required, any of the actual tools which themselves would be wheeled units independently supported for movement over the ground even when disconnected from the tractor.

A general object of the present invention has been to provide a frame including a driving motor which, of itself, is not a complete tractor unit and has no wheeled method for moving it over the ground. This unit is attached, as circumstances dictate, to any one of several wheeled pieces of ground equipment, such that there is no duplication of wheeled units in contact with the ground. A further object of the invention is to provide a novel mechanism by which the frame carrying the motor and the control handle may be easily mounted on a second frame which forms part of the ground working tool and carries the wheels that are driven by the removable motor. Still another object is to provide an improved form of latching mechanism for securing the two frames together, which mechanism is operated by a simple motion of the control handle.

Other objects of the invention will become apparent from the following specification and from reference to the drawings in which is described and shown a preferred form of the invention. It will be understood that modifications may be made in the disclosed form of the invention without departing from the meaning of the appended claims.

Referring now to the drawings:

Figure 1 is a side elevation, partially in section, of the frame on which is carried the driving motor and the control handle;

Figure 2 is a section through Figure 1, as indicated by the lines 2—2 thereon;

Figure 3 is a fragmentary section in a plane parallel to Figure 1, illustrating the attachment of the motor carrying frame to the frame which forms part of the ground working tool;

Figure 4 is a perspective of a type of tractor unit on which the motor and its frame may be mounted;

Figure 5 is a perspective of a complete assembly of motor, frame, tractor element and cultivator; and, Figure 6 is a perspective of a lawn mower, constituting one representative form of ground working equipment to which the motor and frame may be secured.

Referring now to Figures 1 and 2, there is provided a frame 10 to which is rigidly secured a driving motor 12 by bolts 13 and nuts 14, the bolts being received in openings 15 of the frame 10 and in slotted bosses 16 (shown in dotted lines) of the motor 12. As shown in Figure 5, the preferred form of driving motor 12 is a gasoline internal combustion engine. It will be understood that other forms of drive, as an electric motor, may be employed without departing from the invention.

The frame 10 is provided at each end with handles 20 and 22 respectively, by which the frame and motor may easily be moved from place to place.

In order to guide the complete unit over the ground and control its motion, a control handle 25 is provided, as shown in Figures 1 and 5. At the upper end of the handle is a pair of handle bars 26 with control levers 27 and 28 so mounted as to be easily reached by the operator. The connections between the levers 27 and 28 and the motor 12 are not shown because they form no part of the present invention and are of a type familiar to the art.

The handle 25 is pivotally secured at 30 (Figure 1) in bearings 32 (Figure 2) which are formed on tongues 34 extending from the flat plate-like portion of the frame 10 as shown. The actual connection is made by a bolt 36 held in place by nuts 37. The portion of the handle adjacent the pivoted connection is forked as shown in Figure 2 with the fork elements being indicated at 38 to provide a spaced apart central region, as will be hereinafter described.

The frame 10 carrying the motor 12 is, as indicated, adapted to be secured to a portion 40 of a second frame which carries the ground working tool and the wheels for moving it over the ground. The portion 40 is in the shape of a plate and is provided with two pairs of slots 41 and 42 (Figures 1 and 4). The slots 41 and 42 are adapted to be engaged by hooks carried by the first frame portion 10, which in combination form a latch mechanism securing both frames together. One pair of these hooks, indicated at 44, are fixed to frame 10 and are positioned to underlie and make engagement with the edges of the slots 41. As is shown in Figure 1, these hooks 44 have concaved arcuate upper surfaces 43, and, when urged forwardly into contact with the forward edges of slots 41, exert a camming action which tends to draw the plates 10 and 40 into tightly abutting contact.

A second pair of hooks is indicated at 45 and these hooks are shiftably mounted on the frame 10. By this means it is possible to retract them to the position shown in Figure 3 so that the two assemblies may be placed in contact with each other, as shown in Figure 1, with hooks 44 engaging slots 41, and the hooks 45 then shifted from the position of Figure 3 to the position of Figure 1.

To permit the hooks 45 to be shifted, they are pivotally mounted on the pivot point 30 of the control handle, and in the preferred embodiment of the invention are formed as extensions of the fork arms 38 as shown. With this construction it follows that when the control handle 25 is rocked clockwise (Figures 1 and 3) the hooks 45 are removed from engagement with the edges of slots 42. On the other hand, when the control handle is rocked in a counter-clockwise direction, the hooks 45 are shifted into locking position with the edges of slots 42. When the hooks 45 are engaged, tip portions 46 contact the bottom surface of frame 40 to force the frame 10 and 40 into tightly abutting contact. At the same time, the body portions 48 of the hooks contact the rear edges of the slots 42 to urge the frame 10 forwardly with respect to frame 40 so as to move the first pair of hooks 44 tightly into engagement with their respective slots 41 as heretofore described.

To maintain the hooks 44 and 45 in locked position with respect to the frame member 40 and the control handle 25 in the position shown in Figure 1, a lock is provided. This lock is formed by providing a threaded element or pressure member 50 which has an eye portion 51 loosely encircling the bolt 36, as shown in Figures 1 and 2. A wing nut 52 is mounted on the threaded portion 50. A lug 53 (Figure 3) is pivotally carried within the forks 38 of the handle 25 on a pin 54. The lug is slotted as at 55 to accommodate the threaded member 50, and has a convexly cam-shaped lower surface 57. To complete the lock, an extension 56 (Figure 1) is provided on the frame member 10, such that contact is made with it by the lug 53 when the wing nut 52 is tightened.

The complete locking motion is shown by reference to Figures 1 and 3. In the latter figure, the wing nut is in a position where the lug 53 can drop over the end of the frame extension 56 permitting the hooks 45 to drop into their slots 42. The handle is then raised to the position shown in Figure 1 and held there while the wing nut 52 is tightened. This forces the cam surface 57 of the lug 53 tightly against the extension 56 locking the handle in place and also locking the upper frame 10 to the lower frame portion 40 as shown. Because of the camming action of cam surface 57 against extension 56, the force exerted by pressure member 50 on the handle 25 and hooks 45 to maintain them in the locked position is greatly increased. The hooks 44 are at the same time pushed tightly against the edges of the slots 41, as shown. To separate the two frame sections, the procedure is reversed, as will be understood.

The mechanism above described may be used with various types of ground working tools as stated. Figure 4 shows such a ground working tool in the form of a tractor comprising a pair of wheels 60 mounted on an axle 61 carried in a frame 62. A power drive pulley 64 is provided which makes connection through a chain drive 65 with the axle 61. Slots 41 and 42 are provided in member 40, all as above described, so that frame 10 with motor 12 may be rigidly secured on the tractor. A belt is then connected from the motor 12 to the pulley 64 so that when the motor is operated and the clutch is engaged, the wheels 60 are rotated and the tractor moved over the ground.

Another form of ground working tool is illustrated in Figure 5 which shows in assembly all of the elements forming a complete operating unit of the present invention. In this figure is shown the motor 12, control handle 25 and frame 10 mounted on a ground working tool in the form of a tractor unit, such as that described in Figure 4. The tractor unit is provided with a connecting bar 70 on which is mounted a small cultivator 72 by virtue of sleeve 73 secured to the cultivator and adapted to be slid over the bar 70 and held in place by a removable pin 74.

Figure 6 illustrates a third type of ground working unit that may be used with the present invention and this is in the form of a lawnmower. This mower is of the type having a rotating blade mounted in a plane parallel to the ground and as such is driven by a shaft 75 to which is secured a pulley 76 driving the rotary blade, not shown but encased within a protecting frame 78. This unit is provided with the slots 41 and 42 in portion 40 as described above. The entire unit is mounted on four wheels 80 which may be drivingly connected with the pulley wheel 76 in a manner well known in the art and not further described. When the motor unit has been secured in slots 41 and 42, a belt is connected from the motor pulley to the pulley wheel 76 and thus, as the motor 12 is driven and the clutch engaged, the pulley wheel 76 is rotated and the mowing operation performed.

In certain types of garden tools, of which some sizes of the unit shown in Figure 6 are typical, the assembled unit is pushed over the ground by the operator holding the handle bars 26. On the other hand, if it is a unit of a heavier type, then not only is the motor 12 used to drive the cutting bar, but also the wheel assembly of which it forms a part.

From the foregoing specification and the drawings, it will be seen that I have provided a new and improved form of garden tractor tool. The novel elements of the same are described in the appended claims.

Having described my invention, what I claim as new and novel is:

1. In power driven mechanism of the class described, a frame with a driving motor secured thereto, a control handle shiftably carried by said frame, latch mechanism carried by said frame and movable consequent upon shifting of said control handle, a second frame, wheel elements carried by said second frame to move the same over the ground, a ground working tool secured to said second frame, latch mechanism carried by said second frame complementary to the latch mechanism carried by said first frame, engaging portions on said two frames adapted to be placed in contact with each other and locked together by said latch mechanisms to support said first frame wholly on the wheel elements of said second frame and a power connection on each frame, said connections being adapted to be coupled together to drive said ground working tool, a camming lug, and a pressure applying member secured to one of said frames and adapted to apply pressure to said camming lug to force said latch mechanisms into locked engagement, said latch mechanisms being non-yieldable.

2. In power driven mechanism of the class described, a frame with a driving motor secured thereto, a control handle shiftably carried by said frame, latch mechanism including fixed elements carried by said frame and movable elements secured to said control handle and shiftable consequent upon shifting of said control handle, a second frame, wheel elements carried by said second frame to move the same over the ground, a ground working tool secured to said second frame, latch mechanism carried by said second frame complementary to the latch mechanism carried by said first frame including elements adapted to engage said fixed elements and elements adapted to engage said movable elements, engaging portions on said two frames adapted to be placed in contact with each other and locked together by said latch mechanisms to support said first frame wholly on the wheel elements of said second frame and a power connection on each frame, said power connections being adapted to be coupled together to drive said ground working tool.

3. In a power driven mechanism of the class described, a frame with a driving motor carried thereby, a second frame embodying a ground working tool, latch mechanism to lock said frames together as a unit comprising a plurality of slots carried by one frame, a plurality of hooks carried by the other frame adapted to engage the edge of respective slots, one of said hooks being fixedly carried on its frame, another hook being shiftably carried on its frame, means to shift said latter hook into and out of engagement with its respective slot to lock said frames together or release said frames for separation, a control handle movably carried by the hook carrying frame, a connection between said handle and said shiftably mounted hook to shift said hook upon movement of said handle, a lock to lock said shiftably mounted hook in engagement with a respective slot.

4. In a power driven mechanism of the class described, a frame with a driving motor carried thereby, a second frame embodying a ground working tool, latch mechanism to lock said frames together as a unit comprising a plurality of slots carried by one frame, a plurality of hooks carried by the other frame adapted to engage the edge of respective slots, one of said hooks being fixedly carried on its frame, another hook being shiftably carried on its frame, means to shift said latter hook into and out of engagement with its respective slot to lock said frames together or release said frames for separation, a control handle movably carried by the hook carrying frame, a connection between said handle and said shiftably mounted hook to shift said hook upon movement of said handle, pressure applying means to urge said shiftably mounted hook into engagement with its respective slot and counter-urge said fixed hook away from said shiftably mounted hook and into engagement with its respective slot, wheel elements carried by said second frame and a driving connection between said driving motor and said wheel elements.

5. The mechanism set forth in claim 4, including handle means on said first mentioned frame to lift said driving motor and frame into position with said second frame prior to latching said frames together.

References Cited in the file of this patent

UNITED STATES PATENTS

| | | |
|---|---|---|
| 2,489,274 | Donald | Nov. 29, 1949 |
| 2,522,934 | Engnell | Sept. 19, 1950 |
| 2,695,071 | Hupp | Nov. 23, 1954 |

FOREIGN PATENTS

| | | |
|---|---|---|
| 114,022 | Switzerland | Mar. 1, 1926 |
| 139,511 | Australia | Nov. 22, 1950 |